US008422047B2

(12) United States Patent  (10) Patent No.: US 8,422,047 B2
Ohta  (45) Date of Patent: Apr. 16, 2013

(54) IMAGE PROCESSING APPARATUS, IMAGE PROCESSING METHOD, AND PROGRAM PRODUCT WHICH DETERMINES WHETHER THERE IS A RESTRICTION OF THE OUTPUT OF DOCUMENT DATA

(75) Inventor: Shingo Ohta, Chiba (JP)

(73) Assignee: Ricoh Company, Limited, Tokyo (JP)

( * ) Notice: Subject to any disclaimer, the term of this patent is extended or adjusted under 35 U.S.C. 154(b) by 543 days.

(21) Appl. No.: 12/706,539

(22) Filed: Feb. 16, 2010

(65) Prior Publication Data
US 2010/0239171 A1 Sep. 23, 2010

(30) Foreign Application Priority Data
Mar. 18, 2009 (JP) ................. 2009-067112

(51) Int. Cl.
*G06K 15/00* (2006.01)
(52) U.S. Cl.
USPC ............ 358/1.14; 358/1.1; 358/1.2; 382/254; 707/694
(58) Field of Classification Search ................ 358/1.14, 358/1.15, 1.16, 1.1, 1.2; 715/273, 634, 763, 715/853; 382/190, 254
See application file for complete search history.

(56) References Cited

U.S. PATENT DOCUMENTS 7,595,903 B2    9/2009  Kizaki et al.
7,817,294 B2 *  10/2010 Mitsui .......................... 358/1.15
2005/0012940 A1  1/2005  Matsuda
2007/0097444 A1 *  5/2007  Maeno ......................... 358/3.28
2008/0021862 A1  1/2008  Ohta
2009/0262390 A1 * 10/2009  Tanaka ......................... 358/1.15

FOREIGN PATENT DOCUMENTS
JP    3841645    8/2006
JP    4268117    2/2009

OTHER PUBLICATIONS

English Machine Translation of JP 2002-232617-A (Araumi, Published Aug. 16, 2002).*
English Machine Translation of JP 2005-182761-A (Mihira, Published Jul. 7, 2005).*

* cited by examiner

*Primary Examiner* — Benny Q Tieu
*Assistant Examiner* — Juan M Guillermety
(74) *Attorney, Agent, or Firm* — Oblon, Spivak, McClelland, Maier & Neustadt, L.L.P.

(57) ABSTRACT

A storage unit stores therein a plurality of document data and a reoutput condition associated with any of the document data. The reoutput condition defines an output condition used when the document data is reoutput. A selection receiving unit receives selections of the document data including at least one reoutput-conditioned document data that is associated with the reoutput condition as document data to be output. A condition setting unit sets the reoutput condition associated with selected reoutput-conditioned document data as the output condition. An image output unit outputs all the document data of which the selections are received by the selection receiving unit on the output condition set by the condition setting unit.

19 Claims, 17 Drawing Sheets

|  | ATTRIBUTE OF DOCUMENT DATA | ITEM OF OUTPUT CONDITION |
|---|---|---|
| 001 | A3 | 200% |
| 002 | BLACK-AND-WHITE | COLOR |
| ⋮ | ⋮ | ⋮ |

IMAGE PROCESSING APPARATUS, IMAGE PROCESSING METHOD, AND PROGRAM PRODUCT WHICH DETERMINES WHETHER THERE IS A RESTRICTION OF THE OUTPUT OF DOCUMENT DATA

CROSS-REFERENCE TO RELATED APPLICATIONS

The present application claims priority to and incorporates by reference the entire contents of Japanese Patent Application No. 2009-067112 filed in Japan on Mar. 18, 2009.

BACKGROUND OF THE INVENTION

1. Field of the Invention

The present invention relates to a technology for reusing an output condition that is once set at the time of output data.

2. Description of the Related Art

There has conventionally been proposed an image processing apparatus including a function of automatically setting a previously-used output condition when reusing data in which the output condition at the previous output is recorded to omit a process of setting an output condition thereby outputting data to be output quickly.

The term "output condition" here, for example, in a copy function, means various features, such as an original size, a type of original, density, specification of reduction/enlargement, N in 1, staple, punch, duplex, and sort, and in a facsimile function, means processing conditions, such as a text size, an original size, a type of original, density, a destination fax number, and sending date and time.

Furthermore, there has also been proposed an image processing apparatus including a function of storing an output condition set at the time of output as an output condition to be reset at the time of reoutput (hereinafter, referred to as a "reoutput condition") together with an output document and automatically reflecting the reoutput condition in the setting when reoutputting a document in which the reoutput condition is recorded (for example, see Japanese Patent No. 3841645).

Specifically, Japanese Patent No. 3841645 discloses a document-data input/output device that preliminarily stores a reoutput condition applied to a plurality of document data in common, accumulates a plurality of document data, receives an instruction to output the accumulated document data, and outputs the document data specified by the instruction with the addition of the stored reoutput condition.

However, in the technology disclosed in Japanese Patent No. 3841645, the reoutput condition is a collection of output conditions that can be applied to a plurality of document data in common, thus it is not possible to store an individual output condition of document data as the reoutput condition nor reoutput a plurality of document data with the output condition applied thereto.

SUMMARY OF THE INVENTION

It is an object of the present invention to at least partially solve the problems in the conventional technology.

According to one aspect of the present invention, there is provided an image processing apparatus including: a storage unit that stores therein a plurality of document data and a reoutput condition associated with any of the document data, the reoutput condition defining an output condition used when the document data is reoutput; a selection receiving unit that receives selections of the document data including at least one reoutput-conditioned document data that is associated with the reoutput condition as document data to be output; a condition setting unit that sets the reoutput condition associated with selected reoutput-conditioned document data as the output condition; and an image output unit that outputs all the document data of which the selections are received by the selection receiving unit on the output condition set by the condition setting unit.

Furthermore, according to another aspect of the present invention, there is provided an image processing method executed in an image processing apparatus that includes a storage unit that stores therein a plurality of document data and a reoutput condition associated with any of the document data. The reoutput condition defines an output condition used when the document data is reoutput. The image processing method includes: receiving selections of the document data including at least one reoutput-conditioned document data that is associated with the reoutput condition as document data to be output; setting the reoutput condition associated with selected reoutput-conditioned document data as the output condition; and outputting all the document data of which the selections are received at the receiving on the output condition set by the condition setting unit.

Moreover, according to still another aspect of the present invention, there is provide a computer program product including a computer-usable medium having computer-readable program codes embodied in the medium for implementing an image processing method executed in an image processing apparatus that includes a storage unit that stores therein a plurality of document data and a reoutput condition associated with any of the document data. The reoutput condition defines an output condition used when the document data is reoutput. The program codes when executed cause a computer to execute: receiving selections of the document data including at least one reoutput-conditioned document data that is associated with the reoutput condition as document data to be output; setting the reoutput condition associated with selected reoutput-conditioned document data as the output condition; and outputting all the document data of which the selections are received at the receiving on the output condition set by the condition setting unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an image processing apparatus according to the present invention are explained in detail below with reference to the accompanying drawings.

Figure 1:
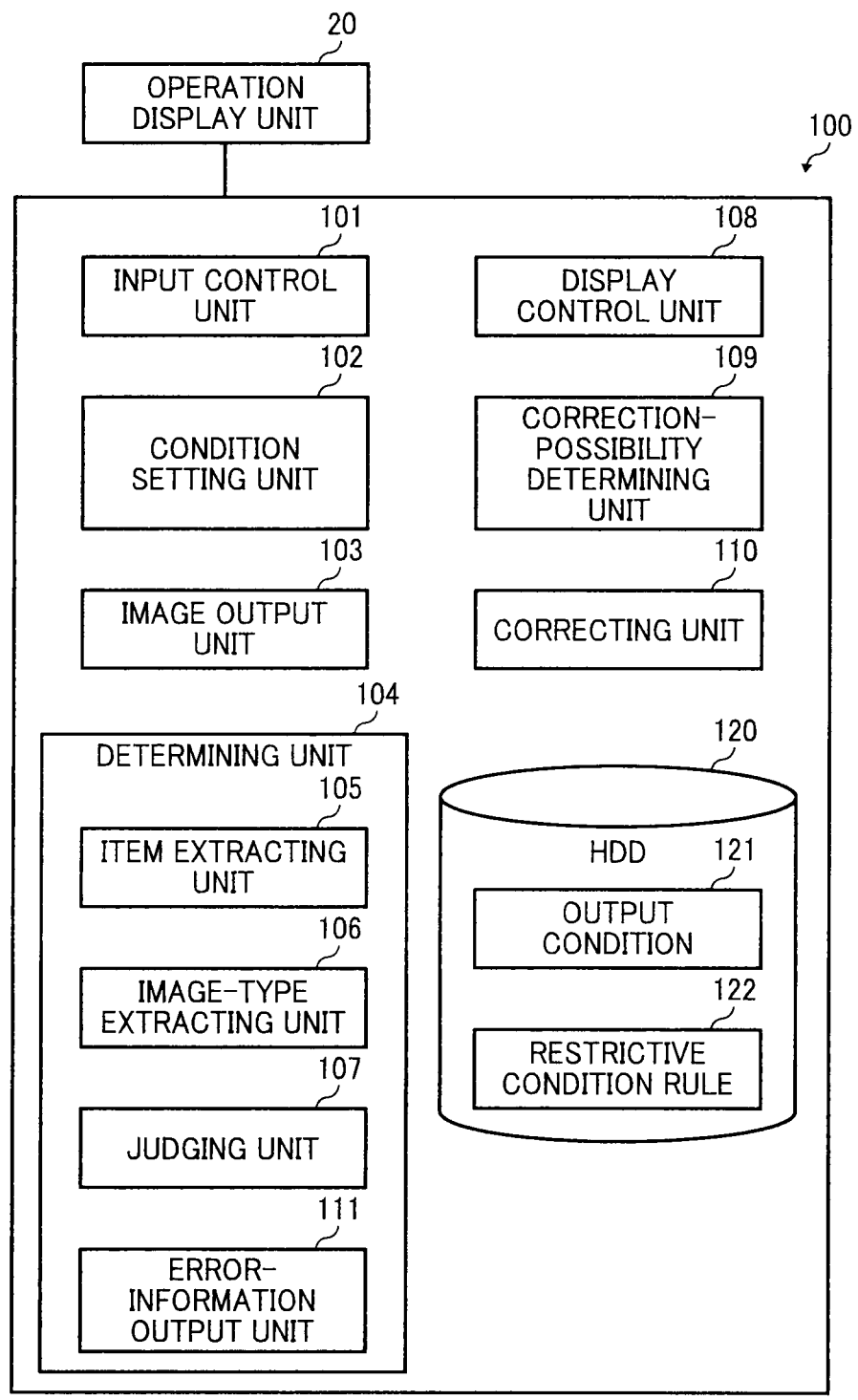
FIG. 1 is a block diagram of an image processing apparatus according to a first embodiment.

FIG. 1 is a block diagram illustrating a configuration of an image processing apparatus 100 according to a first embodiment of the present invention. As shown in FIG. 1, the image processing apparatus 100 mainly includes an input control unit 101, a condition setting unit 102, an image output unit 103, a determining unit 104, a display control unit 108, a correction-possibility determining unit 109, a correcting unit 110, and an HDD (Hard Disk Drive) 120, and is connected to an operation display unit 20.

The HDD 120 stores therein a plurality of document data, an output condition 121, a reoutput condition, attributes of the document data, and a restrictive condition rule 122.

The output condition 121 here means a condition of an output format of document data, and is composed of items relating to concrete processes in the output.

Furthermore, the reoutput condition here means a condition for restoring an output condition at the time of output of document data when the document data is reoutput and defining the restored output condition as an output condition to be set. An address of a destination where a reoutput condition is stored is stored in the header of document data, thus the reoutput condition is associated with the document data. Hereinafter, document data associated with a reoutput condition is referred to as "reoutput-conditioned document data".

Figure 2:
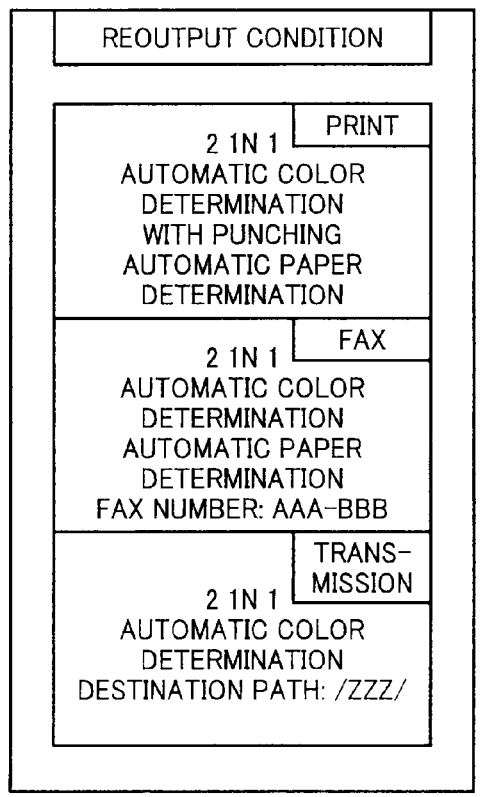
FIG. 2 is a diagram illustrating an example of a reoutput condition.

FIG. 2 is a diagram illustrating an example of a reoutput condition. In FIG. 2, reoutput conditions of document data respectively set in a print job, a fax job, and a transmission job are recorded.

In FIG. 2, first, the reoutput condition in the print job is composed of four items of output conditions: 2 in 1, automatic color determination, with punch, and automatic paper determination. The reoutput condition in the fax job is composed of four items of output conditions: 2 in 1, automatic color determination, automatic paper determination, and a fax number. The reoutput condition in the transmission job is composed of three items of output conditions: 2 in 1, automatic color determination, and a destination path.

Figure 3:
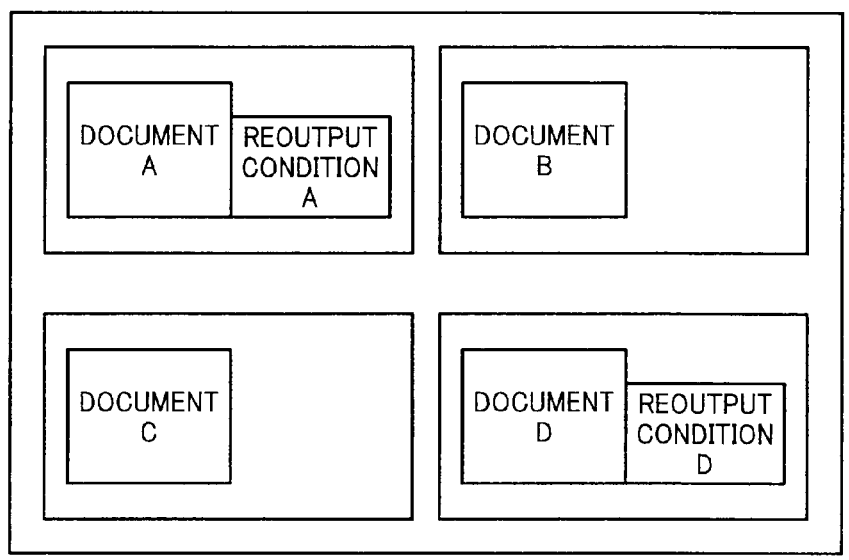
FIG. 3 is a diagram illustrating an example of document data and reoutput-conditioned document data.

FIG. 3 is a diagram illustrating an example of document data and reoutput-conditioned document data. The reoutput-conditioned document data here means document data associated with a reoutput condition.

In FIG. 3, as the reoutput-conditioned document data, document data A associated with a reoutput condition A and document data D associated with a reoutput condition D are stored. On the other hand, as the document data stored alone, i.e., the document data associated with no reoutput condition, document data B and document data C are stored.

Furthermore, the restrictive condition rule 122 here means a rule for restricting an output of certain document data due to a certain output condition of the document data. In the restrictive condition rule 122, an item composing an output condition is associated with an attribute of document data.

Figures 4, 5:
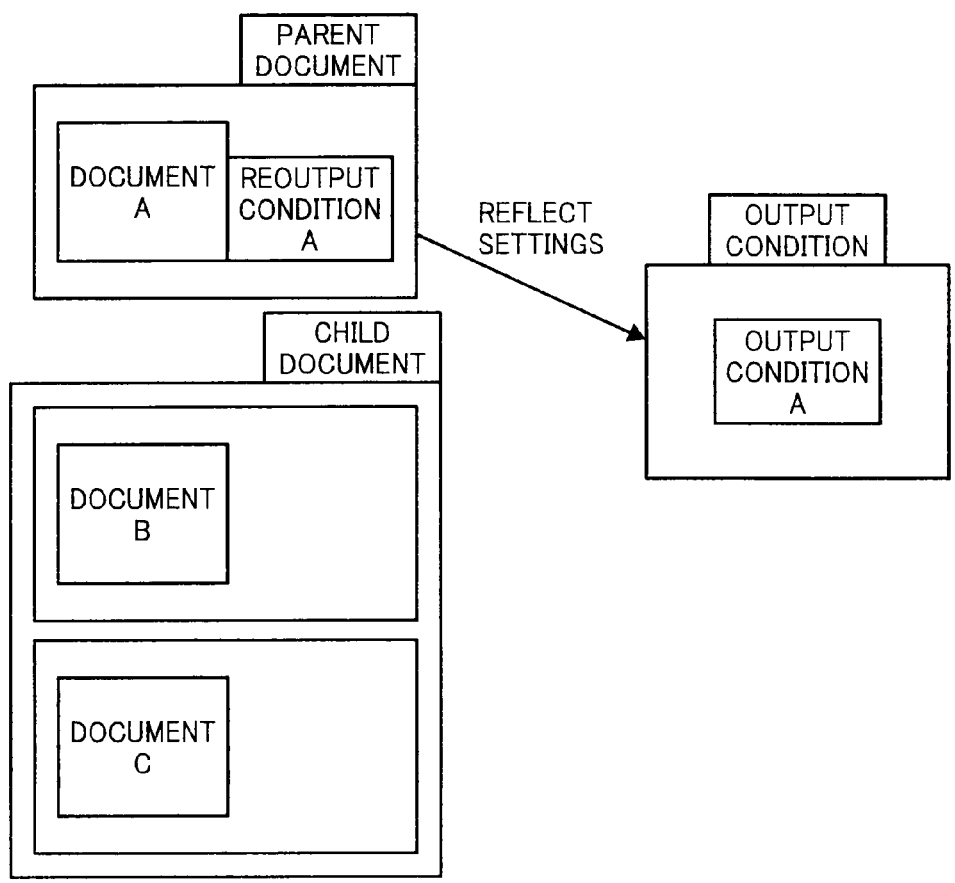
FIG. 4 is a diagram illustrating an example of a restrictive condition rule.
FIG. 5 is a diagram illustrating an example of a reoutput condition set as an output condition.

FIG. 4 is a diagram illustrating an example of the restrictive condition rule. A rule 001 in FIG. 4 defines that document data having an attribute of "A3-sized paper" is restricted in "enlargement of 200%", an item of an output condition.

Furthermore, a rule 002 defines that document data having an attribute of "black-and-white" is restricted in "color", an item of an output condition.

The display control unit 108 is an example of a first display control unit and a second display control unit. The display control unit 108 displays a plurality of document data registered in the HDD 120, including reoutput-conditioned document data, on the operation display unit 20 in selectable form.

The input control unit 101 is an example of a selection receiving unit of the present invention. The input control unit 101 receives inputs of a plurality of selections of document data to be output that are selected from the plurality of document data displayed on the operation display unit 20, including the reoutput-conditioned document data, by a user through the operation display unit 20. Incidentally, the selected document data includes one reoutput-conditioned document data to be a parent document.

The condition setting unit 102 sets a reoutput condition associated with the reoutput-conditioned document data of which the selection as document data to be output is received by the input control unit 101 as the output condition 121.

FIG. 5 is a diagram illustrating an example of a reoutput condition set as an output condition. As shown in FIG. 5, one reoutput-conditioned document data is selected as a parent document from the document data selected as document data to be output, and a reoutput condition associated with the reoutput-conditioned document data is set as an output condition.

The term "parent document" here means reoutput-conditioned document data associated with a reoutput condition set as an output condition out of document data selected as document data to be output. Furthermore, document data other than the parent document out of the document data selected as document data to be output and to which settings of the reoutput condition associated with the parent document are applied is also referred to as a parent document.

In FIG. 5, document data selected as an object to be output is reoutput-conditioned document data A, document data B, and document data C.

Since reoutput-conditioned document data is only the reoutput-conditioned document data A, the reoutput-conditioned document data A is a parent document, and a reoutput condition A associated with the reoutput-conditioned document data A, the parent document, is set as an output condition.

Since the document data B and C are document data other than the reoutput-conditioned document data A out of the document data selected as an object to be output, the document data B and C are child documents.

The determining unit 104 includes an item extracting unit 105, an image-type extracting unit 106, a judging unit 107, and an error-information output unit 111, and determines whether document data other than reoutput-conditioned document data associated with a reoutput condition set as an output condition out of a plurality of document data selected as an object to be output can be output on the set output condition with reference to the restrictive condition rule 122.

Specifically, the item extracting unit 105 extracts items from the reoutput condition associated with the selected reoutput-conditioned document data.

The image-type extracting unit 106 is an example of an attribute extracting unit of the present invention, and extracts attributes composing document data from each document data other than the reoutput-conditioned document data associated with the reoutput condition set as the output condition out of the selected document data.

The judging unit 107 acquires a restrictive item corresponding to any of the attributes extracted by the image-type extracting unit 106 from the restrictive condition rule 122, and compares the acquired restrictive item with the extracted items to check whether there is any item identical to the acquired restrictive item (hereinafter, referred to as an "unsettable item") in the extracted items.

As a result of the comparison, if there is an unsettable item, the judging unit 107 judges that there is document data having an attribute restricted in output of the document data by an output condition in the selected document data. On the other hand, if there is no unsettable item, the judging unit 107 judges that there is no document data having an attribute restricted in output of the document data by a set output condition in the selected document data.

If the correction-possibility determining unit 109 determines that a correction of the restrictive item to an unrestrictive item is impossible, the error-information output unit 111 displays, as an alert, an error message indicating that the item is an uncorrectable item on the operation display unit 20 via the display control unit 108.

Incidentally, as the alert, in addition to displaying the error message on the operation display unit 20, a user can be alerted through a voice output of the error message or the like.

If the determining unit 104 determines that all the selected document data cannot be output on the set output condition, the correction-possibility determining unit 109 determines whether a restrictive item corresponding to any of attributes of the document data determined to be unable to be output on the set output condition can be corrected to an unrestrictive item based on the restrictive condition rule.

Specifically, if it is determined that there is document data of which the output is restricted by the set output condition in the selected document data, the correction-possibility determining unit 109 determines whether there is any item applicable to the extracted attribute corresponding to an unsettable item in the restrictive condition rule. If there is an applicable item, the correction-possibility determining unit 109 determines that a correction of changing the unsettable item out of the extracted items to another item is possible. On the other hand, if there is no applicable item, the correction-possibility determining unit 109 determines that the correction is impossible.

If the correction-possibility determining unit 109 determines that a restrictive item can be corrected to an unrestrictive item, the correcting unit 110 corrects an unsettable item to an applicable item.

The image output unit 103 outputs all document data selected as an object to be output in accordance with the output condition set by the condition setting unit 102 or the output condition corrected by the correcting unit 110.

Figure 6A:
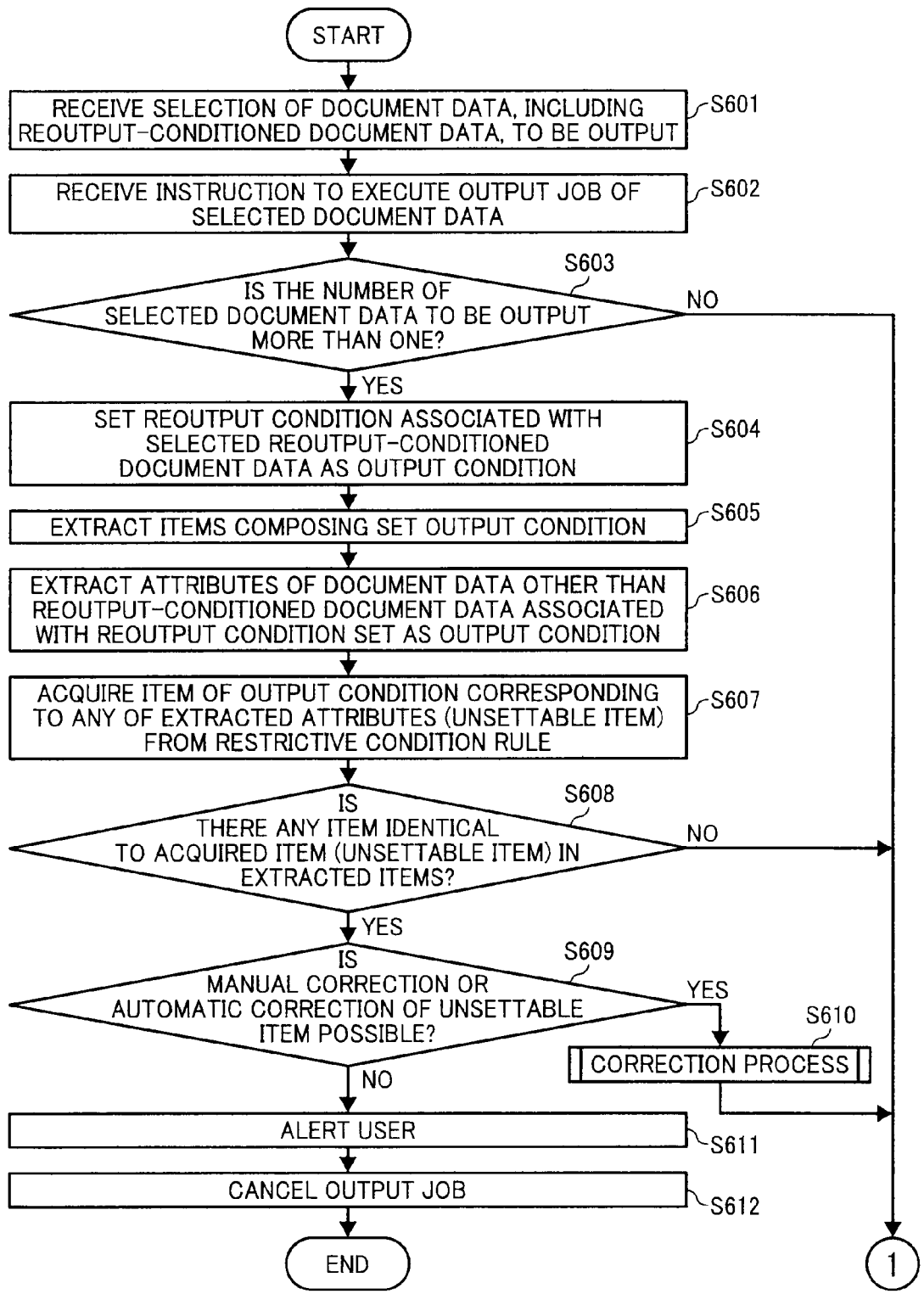
FIG. 6A is a flowchart showing steps of a reoutput-condition setting process performed by the image processing apparatus according to the first embodiment.
Figure 6B:
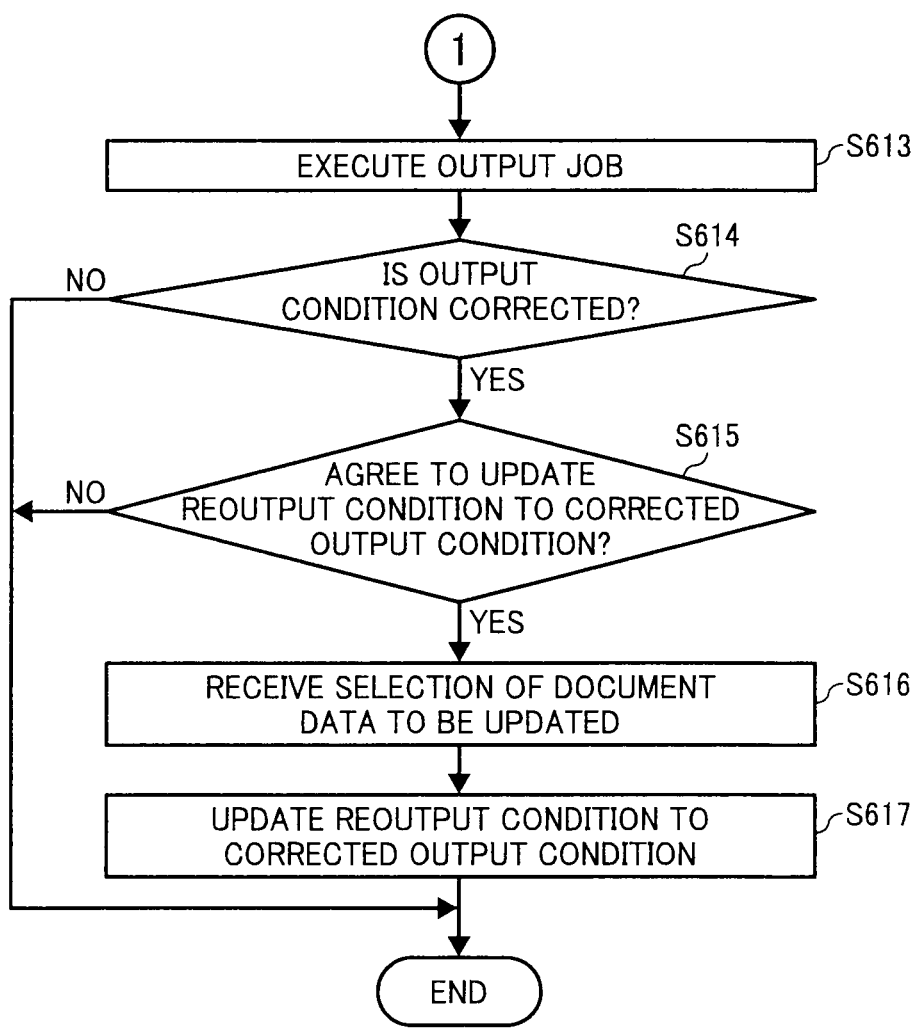
FIG. 6B is a continuation of the flowchart shown in FIG. 6A.

Subsequently, a reoutput-condition setting process performed by the image processing apparatus 100 configured as described above is explained. FIGS. 6A and 6B are flowcharts showing steps to set a reoutput condition.

The display control unit 108 displays all document data stored in the HDD 120, including reoutput-conditioned document data, on the operation display unit 20, and the input control unit 101 receives a selection of document data to be output made by a user through the operation display unit 20 (Step S601).

Here, as the document data to be output, a plurality of document data, including one reoutput-conditioned document data to be a parent document, are selected.

When receiving the selections of document data to be output, the input control unit 101 further receives an input of an instruction to execute an output job of the selected document data (Step S602).

The condition setting unit 102 determines whether the number of the selected document data to be output is more than one (Step S603). If the number of the selected document data to be output is more than one (YES at Step S603), the condition setting unit 102 sets a reoutput condition associated with the selected reoutput-conditioned document data to be the parent document as the output condition 121 in the HDD 120 (Step S604).

When the output condition has been set at Step S604, the item extracting unit 105 of the determining unit 104 extracts items composing the set output condition (Step S605).

The image-type extracting unit 106 of the determining unit 104 extracts attributes of the document data other than the reoutput-conditioned document data associated with the reoutput condition set as the output condition (Step S606).

The judging unit 107 of the determining unit 104 acquires an item of an output condition corresponding to any of the extracted attributes of the document data other than the reoutput-conditioned document data associated with the reoutput condition set as the output condition out of the document data selected as document data to be output from the restrictive condition rule 122 (Step S607).

The judging unit 107 of the determining unit 104 judges whether there is any item identical to the acquired item, i.e., an unsettable item in the extracted items (Step S608).

As a result of the judgment, if it is judged that there is an unsettable item in the extracted items (YES at Step S608), the correction-possibility determining unit 109 determines whether a manual correction or an automatic correction of the unsettable item is possible or not with reference to the restrictive condition rule 122 (Step S609).

As a result of the determination of possibility of a correction, if it is determined that a manual correction or an automatic correction is possible (YES at Step S609), the correcting unit 110 performs a correction process (Step S610).

Figure 7:
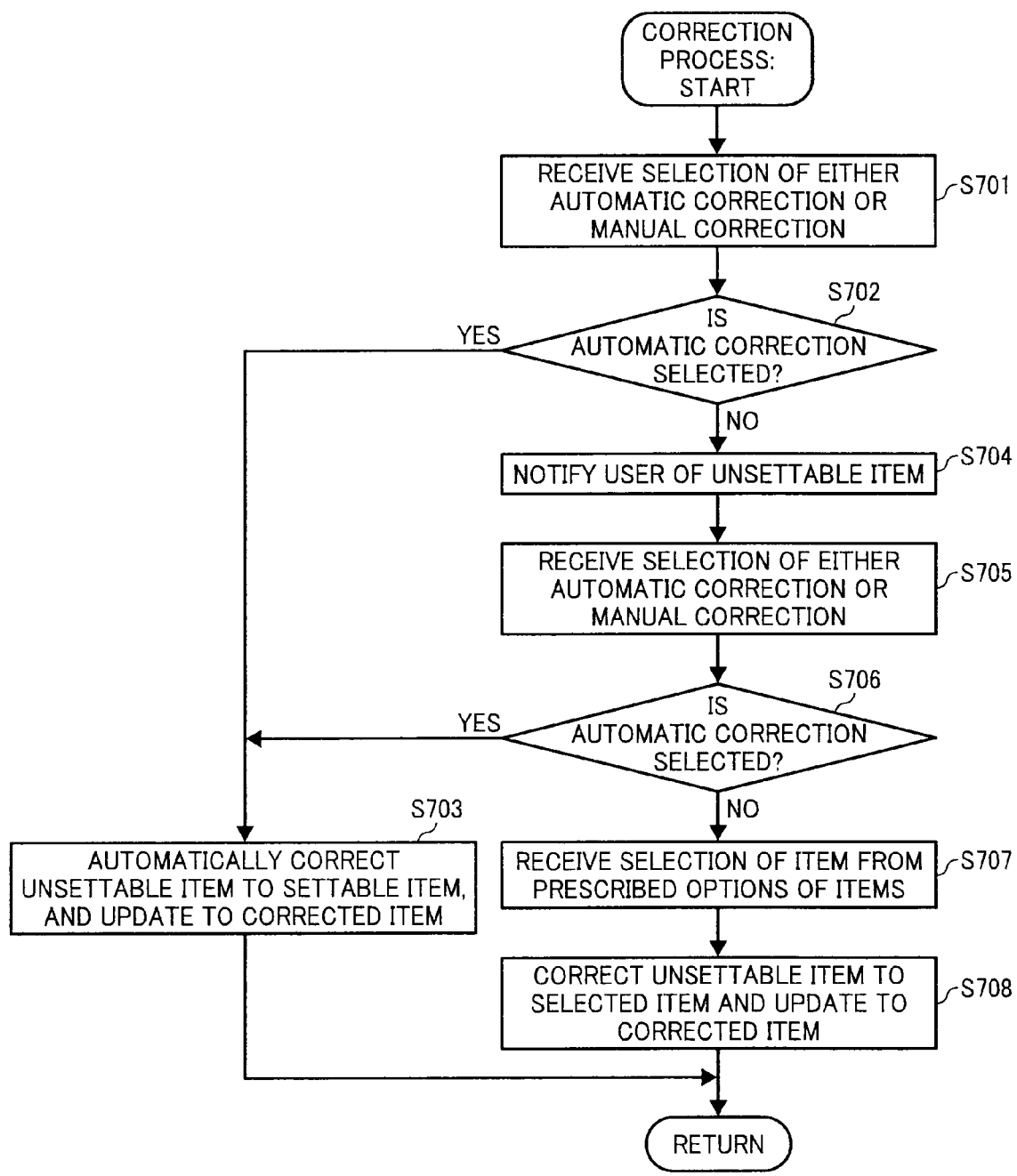
FIG. 7 is a flowchart showing steps of an output-condition correcting process.

The correction process is concretely explained below. FIG. 7 is a flowchart showing a series of steps of the correction process performed by the correcting unit 110.

First, the display control unit 108 displays an item "AUTOMATIC CORRECTION" and an item "MANUAL CORRECTION" on the operation display unit 20 in selectable form, and the input control unit 101 receives a selection of either an automatic correction or a manual correction made by a user through the operation display unit 20 (Step S701).

Figure 8:
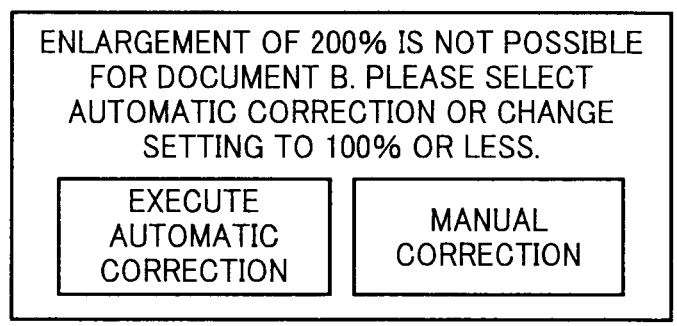
FIG. 8 is a diagram illustrating an example of a dialog box displaying an item "AUTOMATIC CORRECTION" and an item "MANUAL CORRECTION" in selectable form.

FIG. 8 is a diagram illustrating an example of a dialog box asking a user to select either an automatic correction or a manual correction of selecting from prescribed options of items. In this example, a message "Enlargement of 200% is not possible for document B. Please select automatic correction or change the setting to 100% or less." is displayed in the dialog box.

The correcting unit 110 determines whether the automatic correction is selected (Step S702). If the item automatic correction is selected (YES at Step S702), the correcting unit 110 automatically corrects the unsettable item to a settable item that is not registered in the restrictive condition rule 122 and updates to the corrected item (Step S703), and then terminates the correction process.

On the other hand, at Step S702, if the manual correction is selected (NO at Step S702), the error-information output unit 111 alerts the user to the unsettable item by causing the display control unit 108 to display an error message on the operation display unit 20 (Step S704).

The display control unit 108 further displays the item "AUTOMATIC CORRECTION" and the item "MANUAL CORRECTION" on the operation display unit 20 in selectable form, and the input control unit 101 receives an input of a selection of either the automatic correction or the manual correction by the user (Step S705).

The correcting unit 110 determines whether the automatic correction is selected (Step S706). If it is determined that the automatic correction is selected (YES at Step S706), the flow returns to Step S703, and the correcting unit 110 automatically corrects the unsettable item to a settable item and updates to the corrected item (Step S703).

On the other hand, if the manual correction is selected (NO at Step S706), the display control unit 108 displays prescribed options of items in selectable form (Step S707).

Figure 9:
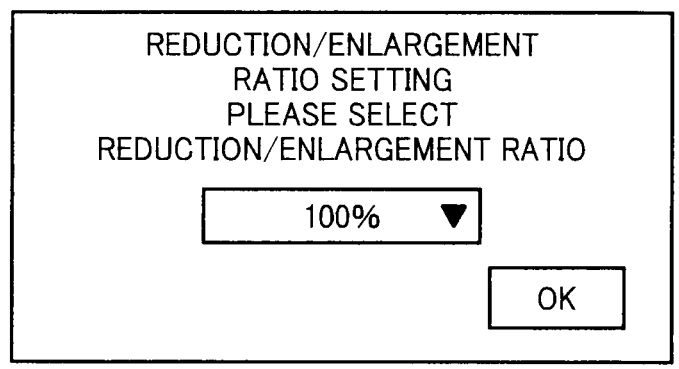
FIG. 9 is a diagram illustrating an example of a dialog box asking a user to select from prescribed options, which is displayed when the manual correction is selected.

FIG. 9 is a diagram illustrating an example of a dialog box asking a user to select from prescribed options, which is displayed when the manual correction is selected. In FIG. 9, a message "Reduction/enlargement ratio setting: Please select reduction/enlargement ratio" is displayed in the dialog box. If the user clicks an icon "100%", other options are displayed.

The correcting unit 110 updates the unsettable item to an item of which the selection made by the user is received by the input control unit 101 (Step S708), and then terminates the correction process.

To return to the explanation of the flowchart shown in FIGS. 6A and 6B, if it is determined that a manual correction or an automatic correction of the unsettable item is not possible (NO at Step S609), the error-information output unit 111 causes the display control unit 108 to display, as an alert, an error message on the operation display unit 20 (Step S611).

The image output unit 103 cancels the output job (Step S612), and the whole process is terminated.

When the correction process at Step S610 has been terminated, or if the number of the selected document data to be output is one (NO at Step S603), or if there is no unsettable item in the extracted items (NO at Step S608), the image output unit 103 outputs the document data on the associated reoutput condition if the document data selected as document data to be output is reoutput-conditioned document data, and outputs the document data on an optionally-specified output condition if the document data selected as document data to be output is document data associated with no reoutput condition (Step S613).

Upon completion of the output job by the image output unit 103 at Step S613, the correcting unit 110 determines whether the output condition is corrected (Step S614).

If the output condition is corrected (YES at Step S614), the display control unit 108 displays a dialog box asking the user whether or not to update the reoutput condition to the corrected output condition (Step S615).

If the update of the reoutput condition is selected (YES at Step S615), the input control unit 101 receives an input of a selection of document data to be updated (Step S616), and updates the selected document data to be associated with the corrected output condition (Step S617). Then, the whole process is terminated.

In this manner, according to the present embodiment, even in a segmented condition, an optional output condition that a user desires can be applied to a plurality of document data to output the document data; thus, a setting process can be simplified.

Furthermore, according to the present embodiment, whether an output condition can be set or not is checked in advance; thus, it is possible to prevent an error at the time of outputting document data actually.

Moreover, according to the present embodiment, it is possible to correct only an item determined to be unable to be updated and update other items; thus, it is possible to increase the versatility. For example, when there are 100 items to be updated, and one of them is an unoutputtable item, it is only necessary to correct the one item; thus, it is possible to enhance the convenience.

Furthermore, according to the present embodiment, when an unoutputtable item is included in a set output condition, the system can update a reoutput condition by automatically correcting the unoutputtable item to an outputtable item.

Moreover, according to the present embodiment, when an unoutputtable item is included in a set output condition, a user can update a reoutput condition by manually correcting the unoutputtable item to an outputtable item optionally.

Furthermore, according to the present embodiment, at the time of outputting document data, it is possible to determine whether a reoutput condition associated with specific document data can be applied to a plurality of document data to be output, or it is possible for a user to make a choice of a necessary item by developing a condition included in the reoutput condition.

Moreover, according to the present embodiment, when a reoutput condition is updated, it is possible for a user to select whether or not to update each item included in an output condition.

Furthermore, according to the present embodiment, at the time of reusing a secure document, if it is not necessary to recreate all functions used at the previous output similarly, only a necessary item is recreated; thus, the setting of the reflected item can be easily cancelled.

Moreover, according to the present embodiment, items of a reoutput condition are displayed in self-explanatory form; thus, it is possible to prevent a wrong transmission due to the setting of an output condition that goes against a user's intention.

Furthermore, a reoutput condition is stored together with specific document data in an associated manner, and a plurality of document data is output on a reoutput condition selected by a user, so that even in a segmented condition, an optional output condition that a user desires can be applied to a plurality of document data to output the document data; thus, a setting process can be simplified.

Figure 10:
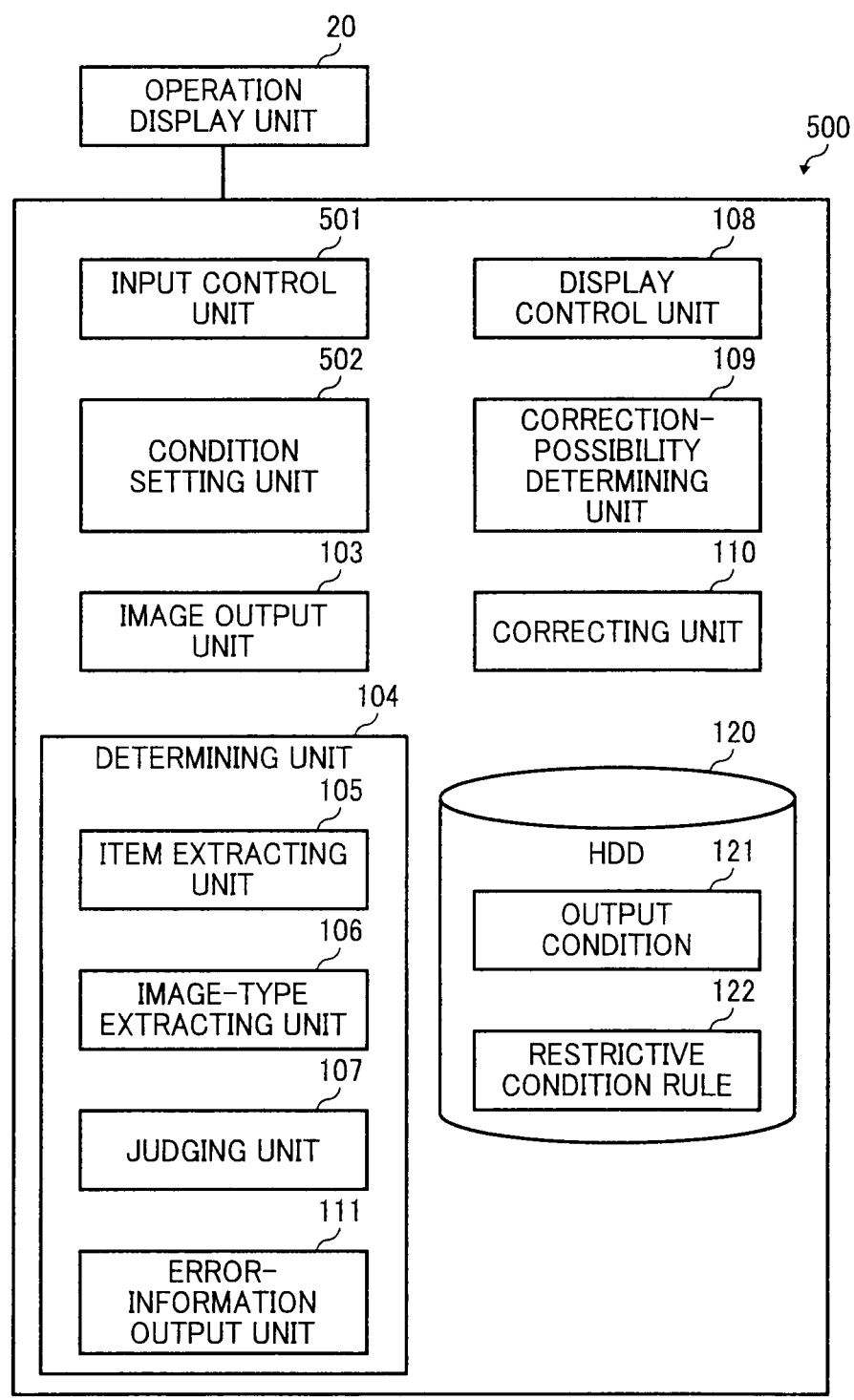
FIG. 10 is a block diagram illustrating a configuration of an image processing apparatus according to a second embodiment.

FIG. 10 is a block diagram illustrating a configuration of an image processing apparatus 500 according to a second embodiment. As shown in FIG. 10, the image processing apparatus 500 mainly includes an input control unit 501, a condition setting unit 502, the image output unit 103, the determining unit 104, the display control unit 108, the correction-possibility determining unit 109, the correcting unit 110, and the HDD 120, and is connected to the operation display unit 20.

In the image processing apparatus 100 according to the first embodiment, the input control unit 101 receives a selection of one reoutput-conditioned document data to be a parent document when receiving inputs of selections of document data to be output.

On the other hand, in the image processing apparatus 500, the input control unit 501 receives selections of a plurality of reoutput-conditioned document data, and the condition setting unit 502 sets a reoutput condition associated with the reoutput-conditioned document data selected to be a parent document from the plurality of reoutput-conditioned document data.

Incidentally, the units other than the input control unit 501 and the condition setting unit 502 have the same configuration and function as those of the image processing apparatus 100 according to the first embodiment, and the description of the units is omitted.

The input control unit 501 is an example of the selection receiving unit of the present invention. The input control unit 501 receives inputs of selections of a plurality of document data, including a plurality of reoutput-conditioned document data that any one of which will be a parent document, from a plurality of document data, including reoutput-conditioned document data, displayed on the operation display unit 20 by the display control unit 108.

The condition setting unit 502 sets down the initially-selected reoutput-conditioned document data out of the plurality of reoutput-conditioned document data to be output of which the selections are received by the input control unit 501 as a parent document, and sets a reoutput condition associated with the parent document as an output condition.

Figure 11A:
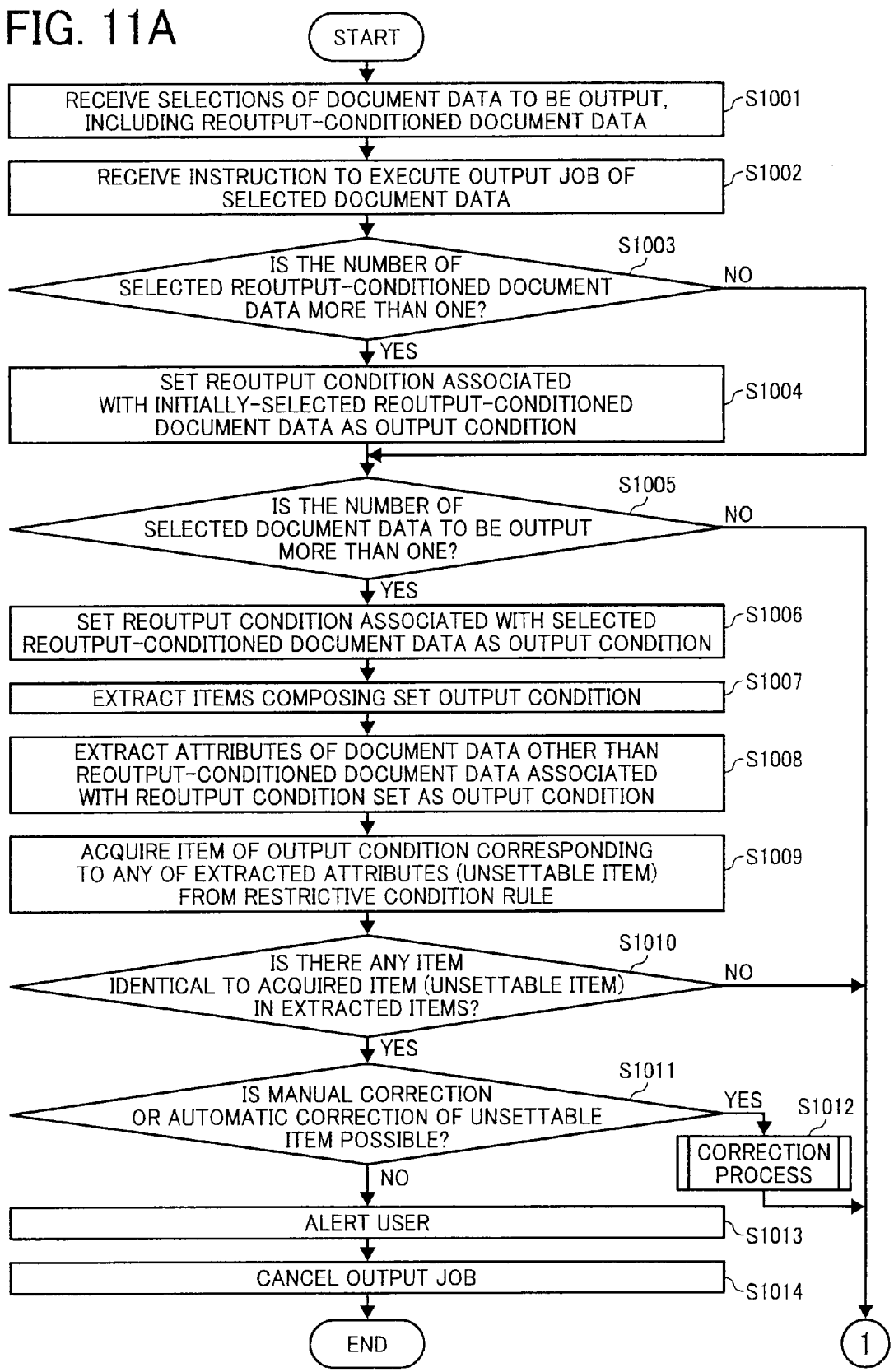
FIG. 11A is a flowchart of a reoutput-condition setting process performed by the image processing apparatus according to the second embodiment.
Figure 11B:
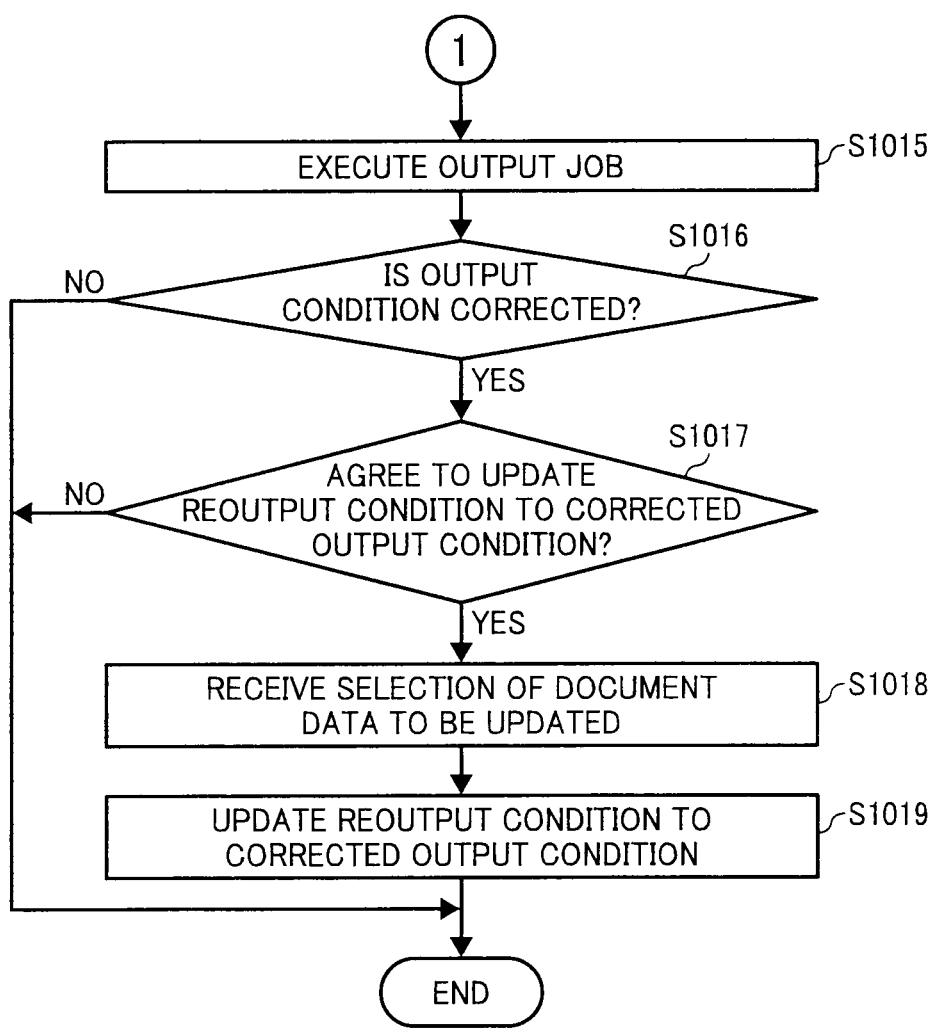
FIG. 11B is a continuation of the flowchart shown in FIG. 11A.

FIGS. 11A and 11B are flowcharts showing a series of steps to receive selections of a plurality of document data, including a plurality of reoutput-conditioned document data, as document data to be output and set a reoutput condition.

The input control unit 501 receives inputs of selections of a plurality of document data to be output, including a plurality of reoutput-conditioned document data (Step S1001).

The input control unit 501 receives an instruction to execute an output job of the plurality of document data to be output of which the selections are received (Step S1002).

The condition setting unit 502 determines whether the number of the reoutput-conditioned document data included in the selected document data is more than one (Step S1003).

When determining that the number of the reoutput-conditioned document data included in the selected document data is more than one (YES at Step S1003), the condition setting unit 502 sets down the initially-selected reoutput-conditioned document data as a parent document, and sets a reoutput condition associated with the parent document as an output condition (Step S1004).

Incidentally, out of the plurality of selected reoutput-conditioned document data, which one of them is to be a parent document is not limited to the initially-selected reoutput-conditioned document data. Alternatively, a user can select any one of the plurality of reoutput-conditioned document data to specify as a parent document.

Steps S1005 to S1019 are identical to Steps S603 to S617 of the reoutput-condition setting process in the first embodiment in FIGS. 6A and 6B, and the description of those Steps is omitted.

Even when a plurality of reoutput-conditioned document data are included in document data selected as an object to be output, a reoutput condition that a user desires can be set as an output condition by selecting reoutput-conditioned document data that the user desires as a parent document.

Figure 12:
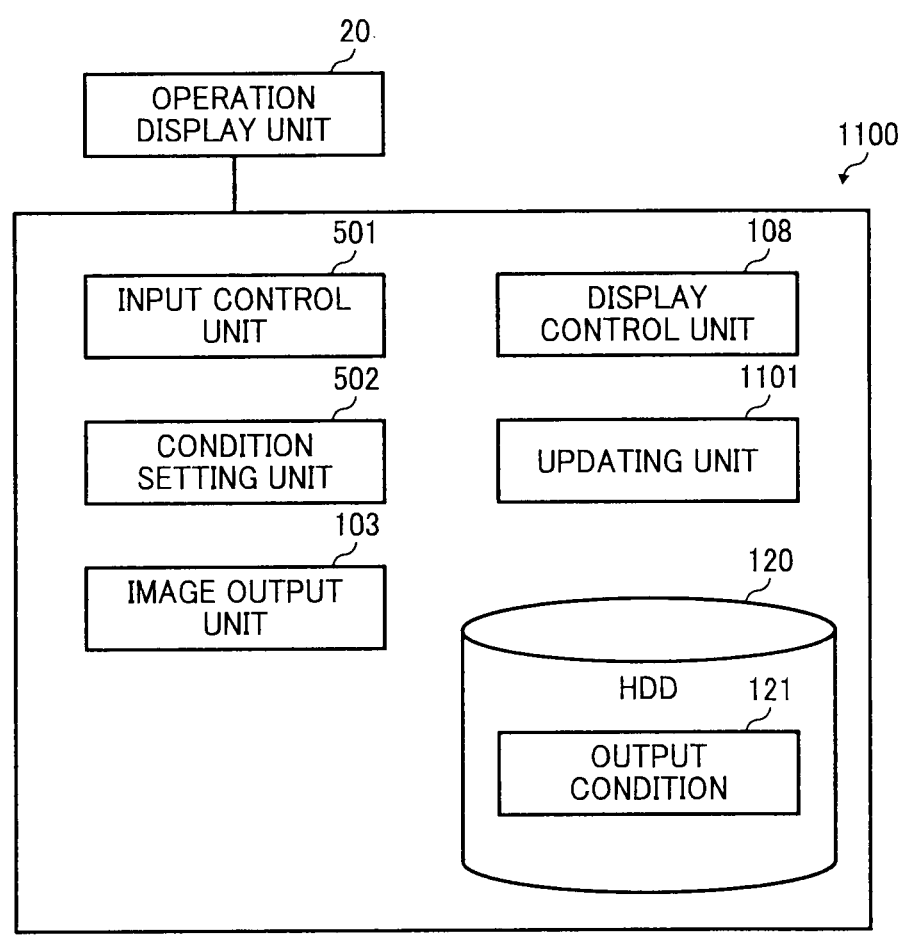
FIG. 12 is a block diagram illustrating a configuration of an image processing apparatus according to a third embodiment.

FIG. 12 is a block diagram illustrating a configuration of an image processing apparatus 1100 according to a third embodiment. The image processing apparatus 1100 according to the present embodiment mainly includes the input control unit 101, the condition setting unit 502, the image output unit 103, the display control unit 108, an updating unit 1101, and the HDD 120, and is connected to the operation display unit 20.

The image processing apparatus 100 according to the first embodiment includes the determining unit 104, the correction-possibility determining unit 109, and the correcting unit 110. In the present embodiment, the image processing apparatus 1100 includes the updating unit 1101 instead of these units.

When an output condition set by the condition setting unit 102 is changed, the updating unit 1101 updates the changed output condition as a reoutput condition.

To change an output condition, there are two ways: one is that the input control unit 101 receives an input of an output condition by a user, and the other is an automatic change by the apparatus.

First, as a case of receiving an input of an output condition by a user, for example, after the condition setting unit 102 sets a reoutput condition as an output condition, the user may change a setting value (including an output condition of those recorded in the reoutput condition other than items).

Furthermore, even when the condition setting unit 102 does not set a reoutput condition as an output condition, the user may set an output condition.

Then, as a case of an automatic change by the apparatus, for example, a paper feed tray may be changed due to run-out of paper, the color setting may be changed due to run-out of toner, etc.

Incidentally, as a case of the automatic change, a change due to an automatic correction as explained in the first embodiment is also included.

Figure 13:
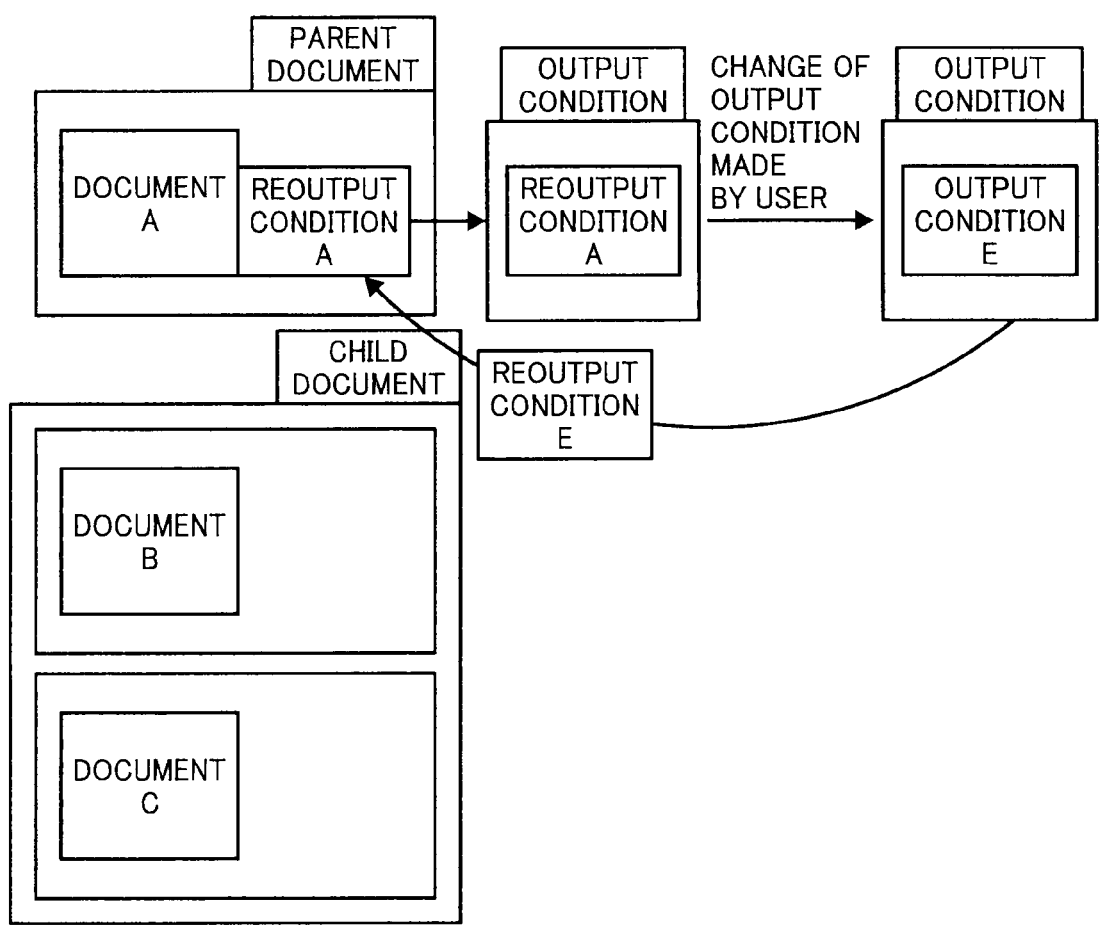
FIG. 13 is an explanatory diagram of a manual updating process with respect to a parent document.
Figure 14:
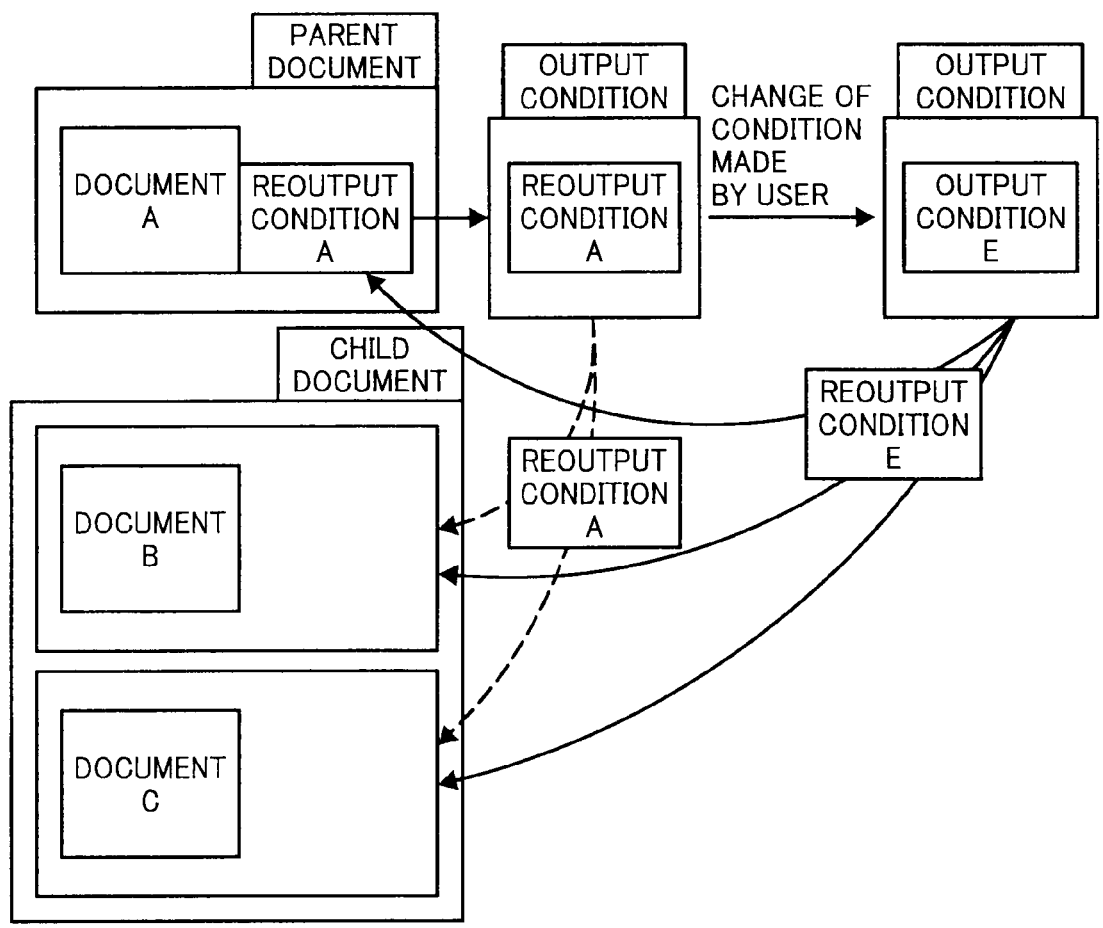
FIG. 14 is an explanatory diagram of a manual updating process with respect to all documents.
Figure 15:
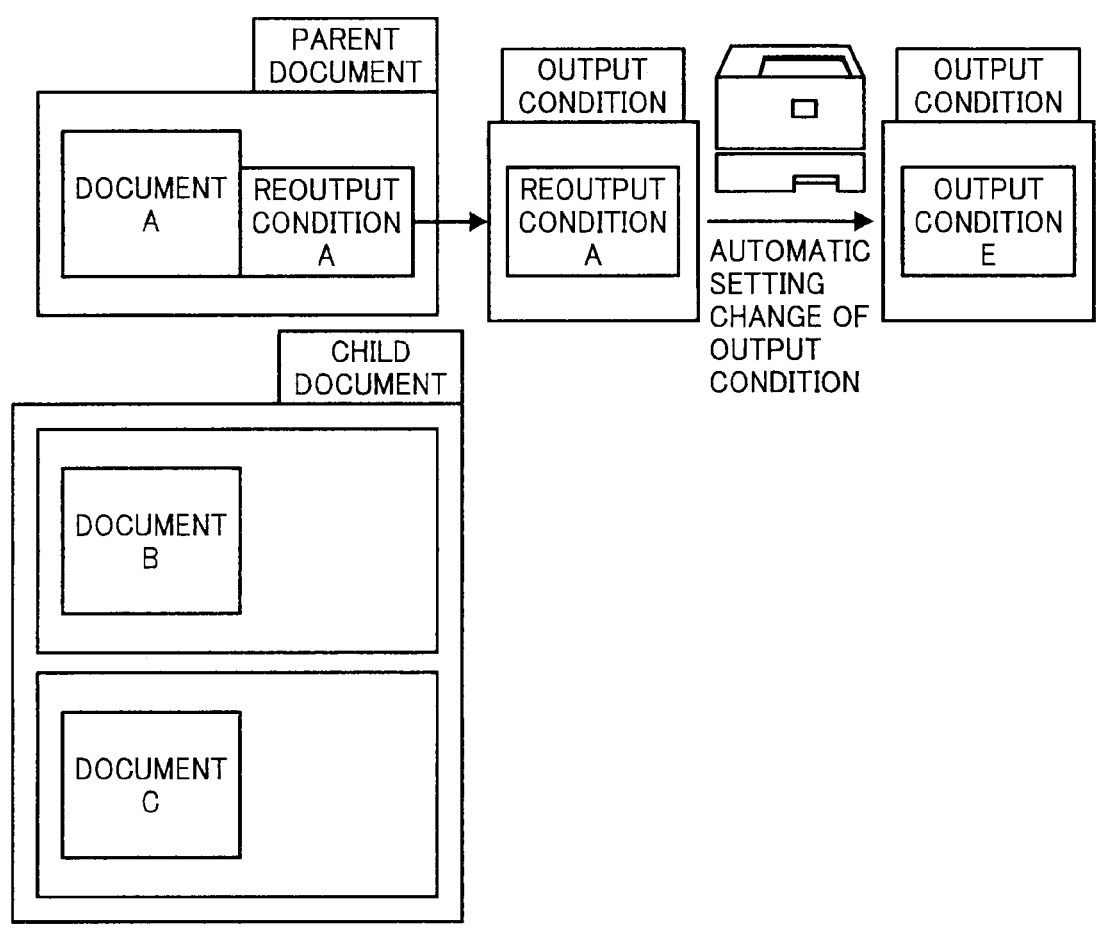
FIG. 15 is an explanatory diagram of an automatic updating process.

FIGS. 13 and 14 are explanatory diagrams of an update process performed when a user manually changes an output condition. FIG. 15 is an explanatory diagram of an update process performed by an automatic change of settings of an output condition.

FIG. 13 shows a case where only a parent document is updated. FIG. 14 shows a case where all document data selected as an object to be output is updated.

In the case shown in FIG. 13, reoutput-conditioned document data A is selected as a parent document, and the condition setting unit 502 sets a reoutput condition A associated with the reoutput-conditioned document data A as an output condition.

Then, when the output condition A is changed to an output condition E by the user, the updating unit 1101 updates the reoutput condition A to be associated with the reoutput-conditioned document data A to the reoutput condition E.

In the case shown in FIG. 14, when reoutput-conditioned document data A is selected as a parent document, and the condition setting unit 502 sets a reoutput condition A associated with the reoutput-conditioned document data A as an output condition, the updating unit 1101 updates all document data to be associated with the set output condition A as a reoutput condition.

After that, when the output condition A is changed to an output condition E by the user, the updating unit 1101 updates all the selected document data to be associated with the output condition E as a reoutput condition.

In the case shown in FIG. 15, reoutput-conditioned document data A is selected as a parent document, and the condition setting unit 502 sets a reoutput condition A associated with the reoutput-conditioned document data A as an output condition.

After that, when the output condition A is changed to an output condition E by an automatic setting change made by the system of the image processing apparatus 1100, the updating unit 1101 updates the set output condition A to the output condition E.

Figure 16:
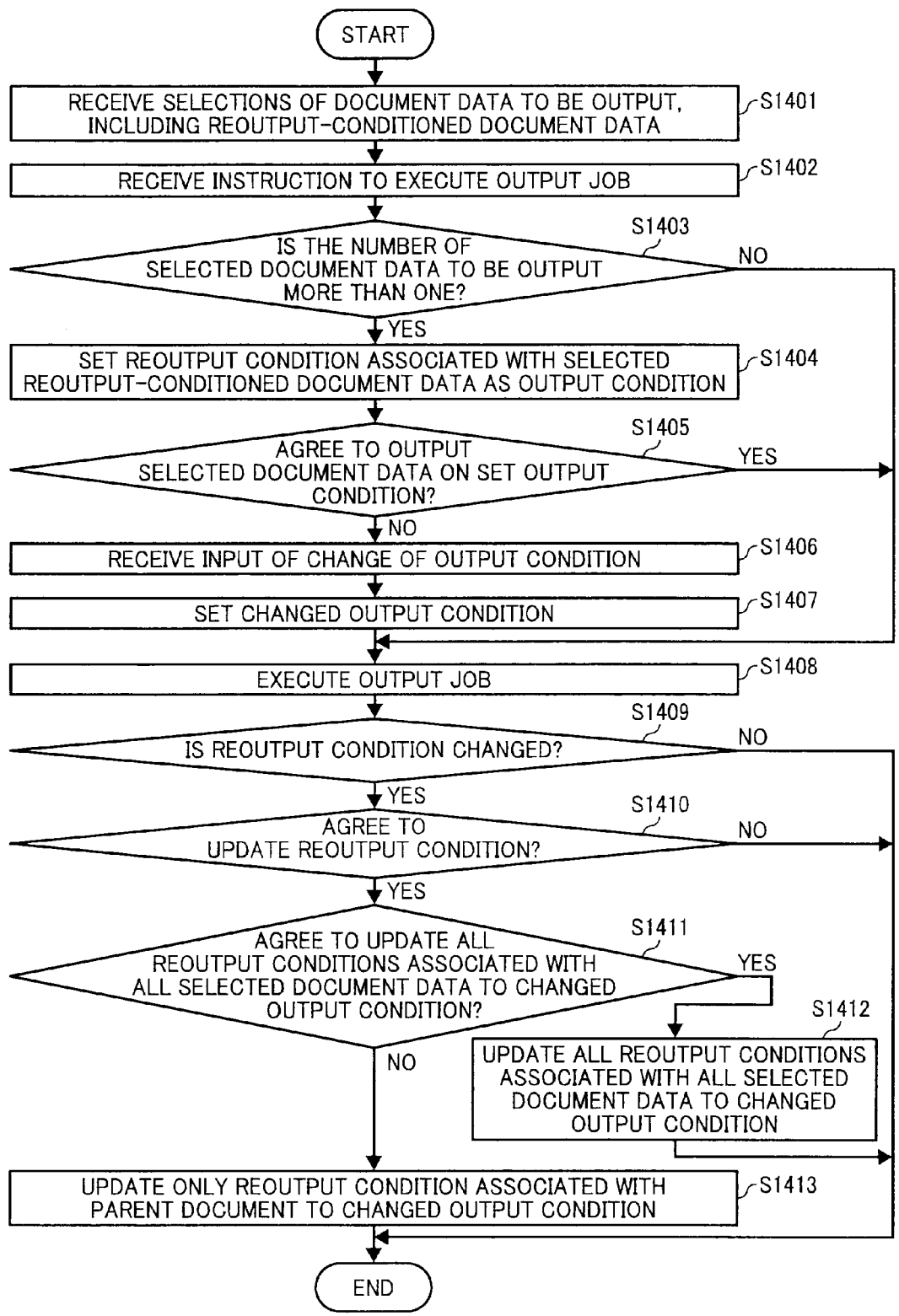
FIG. 16 is a flowchart showing steps of the updating process.

Subsequently, steps of the updating process are explained. FIG. 16 is a flowchart showing a series of steps of the updating process performed by the updating unit 1101.

The input control unit 101 receives selections of a plurality of document data to be output, including reoutput-conditioned document data (Step S1401), and receives an instruction to execute an output job of the plurality of document data of which the selections are received (Step S1402).

The condition setting unit 102 determines whether the number of the selected document data to be output is more than one (Step S1403). If the number of the selected document data to be output is more than one (YES at Step S1403), the condition setting unit 102 sets a reoutput condition associated with the selected reoutput-conditioned document data as an output condition (Step S1404).

The image output unit 103 determines whether to output the selected document data to be output on the set output condition (Step S1405). If determining to output the selected document data to be output on the set output condition (YES at Step S1405), the image output unit 103 outputs the selected document data to be output on the set output condition (Step S1408).

On the other hand, if the image output unit 103 determines not to output the selected document data to be output on the set output condition (NO at Step S1405), the input control unit 101 receives an input of a change of the output condition (Step S1406).

Specifically, the input control unit 101 receives an optional output condition input by a user through the operation display unit 20, or receives a change to an output condition corrected by the automatic correction means explained in the first embodiment.

When the input control unit 101 receives a change of the output condition, the condition setting unit 102 sets a changed output condition (Step S1407).

When the output condition has been set, the image output unit 103 outputs the selected document data in accordance with the set output condition (Step S1408).

If the number of the selected document data to be output is one (NO at Step S1403), or if the set output condition is not changed (YES at Step S1405), the image output unit 103 outputs the selected document data in accordance with the set output condition (Step S1408).

When the document data has been output by the image output unit 103, the updating unit 1101 determines whether the reoutput condition is changed (Step S1409).

If determining that the reoutput condition is changed (YES at Step S1409), the updating unit 1101 determines whether to update the reoutput condition of the document data selected as an object to be output to the changed output condition (Step S1410).

If determining to update the reoutput condition of the document data selected as an object to be output to the changed output condition (YES at Step S1410), the updating unit 1101 determines whether to update all the reoutput conditions associated with all the selected document data to the changed output condition (Step S1411).

If determining to update all the reoutput conditions associated with all the document data to the changed output condition (YES at Step S1411), the updating unit 1101 updates all the reoutput conditions associated with all the document data to the changed output condition (Step S1412).

Incidentally, as for document data associated with no reoutput condition, the changed output condition is associated with the document data as a reoutput condition.

On the other hand, if determining not to update all the reoutput conditions associated with all the document data (NO at Step S1411), the updating unit 1101 updates only the reoutput condition associated with the parent document to the changed output condition (Step S1413).

Specifically, in accordance with an instruction from the updating unit 1101, the display control unit 108 displays options of updating all documents, updating a parent document only, and updating no document on the operation display unit 20 in selectable form.

Figure 17:
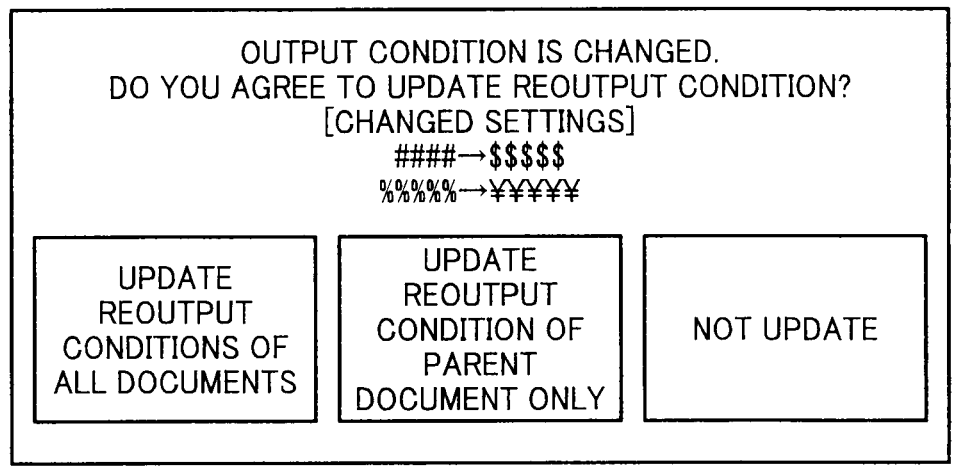
FIG. 17 is a diagram illustrating an example of a dialog box asking the user to select from options of the manual updating process.

FIG. 17 is a diagram illustrating an example of a dialog box asking the user to select from options of the manual updating process. In the dialog box shown in FIG. 17, a message "Do you agree to update reoutput condition?" and output conditions before and after the change are displayed. Furthermore, items "Update all reoutput conditions of all documents", "Update only reoutput condition of parent document", and "Not update" are displayed in selectable form.

Figure 18:
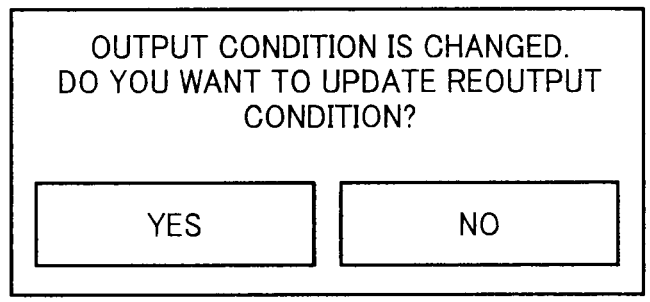
FIG. 18 is a diagram illustrating an example of a dialog box asking the user to select from options of the automatic updating process.

If a setting condition is changed by a correction process explained in the first embodiment, as shown in FIG. 18, a message "Output condition is changed. Do you agree to update reoutput condition?" and two response items: "YES" and "NO" are displayed.

To return to the explanation of the flowchart shown in FIG. 16, if the updating unit 1101 determines that the reoutput condition is not changed at Step S1409 (NO at Step S1409), or if the updating unit 1101 determines not to update the reoutput condition at Step S1410 (NO at Step S1410), the whole process is terminated without performing the update process.

Incidentally, if a user does not want to update the stored reoutput condition each time, it can be configured that the reoutput condition is subject to change only when there is any change by the application of the reoutput condition.

In this manner, according to the present embodiment, when the setting of an output condition is changed, the changed output condition can be restored at the time of reusing stored document data by updating an existing reoutput condition to the changed output condition.

Furthermore, according to the present embodiment, even when a reoutput condition is not applied, if a user changes the setting of an output condition, the reoutput condition can be updated.

Moreover, even when there is any change made by the apparatus, if the change goes against a user's intention, the output condition is further updated by the user; thus, the previous output condition can be restored at the time of using the previous output condition next time.

For example, when the intended output setting cannot be used temporarily because a system failure or the like occurs and restoration takes time, an output error due to an unavailable output condition can be avoided by updating an output condition to an automatically-changed output condition.

Furthermore, according to the present embodiment, a user checks a changed item and determines whether an update can be executed; thus, it is possible to prevent a user's unintended update.

Moreover, according to the present embodiment, the versatility is increased by limiting an object to be updated.

Figure 19:
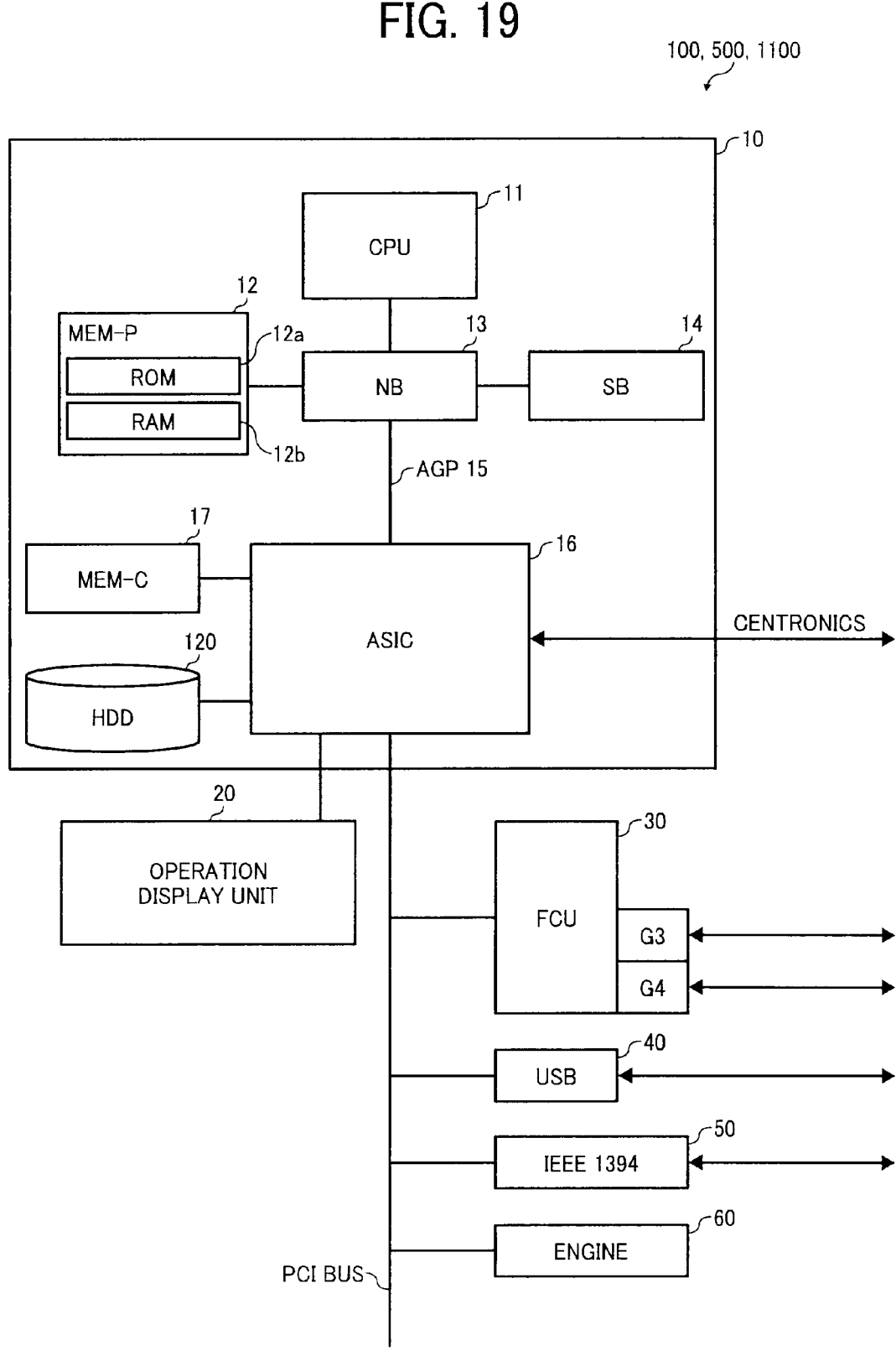
FIG. 19 is a block diagram illustrating a hardware configuration of a multifunction product according to the first to third embodiments.

FIG. 19 is a block diagram illustrating a hardware configuration of a multifunction product (MFP) according to the first to third embodiments. As shown in FIG. 19, the MFP 100, 500, 1100 has a configuration that a controller 10 and an engine unit 60 are connected by a PCI (Peripheral Component Interface) bus. The controller 10 is a controller that controls the entire MFP 100, 500, 1100, drawing, communication, and an input from an operating unit (not shown). The engine unit 60 is a printer engine that can be connected to the PCI bus or the like, and for example, is a black-and-white plotter, a 1-drum color plotter, a 4-drum color plotter, a scanner, a FAX unit, and the like. Incidentally, the engine unit 60 includes an image processing section that performs an error diffusion, a gamma conversion, and the like in addition to a so-called engine section such as the plotters.

The controller 10 includes a central processing unit (CPU) 11, a North Bridge (NB) 13, a system memory (MEM-P) 12, a South Bridge (SB) 14, a local memory (MEM-C) 17, an Application Specific Integrated Circuit (ASIC) 16, and the HDD 120. The NB 13 and the ASIC 16 are connected by an Accelerated Graphics Port (AGP) bus 15. The MEM-P 12 includes a read only memory (ROM) 12a and a random access memory (RAM) 12b.

The CPU 11 controls the entire MFP 100, 500, 1100, and has a chipset composed of the NB 13, the MEM-P 12, and the SB 14. The CPU 11 is connected to other devices via the chipset.

The NB 13 is a bridge for connecting the CPU 11 to the MEM-P 12, the SB 14, and the AGP bus 15. The NB 13 includes a memory controller for controlling read/write with respect to the MEM-P 12 and the like, a PCI master, and an AGP target.

The MEM-P 12 is a system memory used as a memory for storing therein a program or data, a memory for developing the program or the data, a memory for drawing of a printer, and the like. The MEM-P 12 is composed of the ROM 12a and the RAM 12b. The ROM 12a is a read-only memory used for storing therein a program or data. The RAM 12b is a writable and readable memory used for developing the program or the data or for drawing of a printer.

The SB 14 is a bridge for connecting the NB 13 and PCI devices to a peripheral device. The SB 14 is connected to the NB 13 via the PCI bus. A network interface (I/F) unit and the like are also connected to the PCI bus.

The ASIC 16 is an integrated circuit (IC) for image processing, and includes hardware components for image processing. The ASIC 16 serves as a bridge for connecting the AGP bus 15, the PCI bus, the HDD 120, and the MEM-C 17 to one another. The ASIC 16 is composed of a PCI target, an AGP master, an arbiter (ARB) constituting the core of the ASIC 16, a memory controller for controlling the MEM-C 17, a plurality of direct memory access controllers (DMACs) that performs rotation of image data by using a hardware logic or the like, and a PCI unit that performs data transfer to the engine unit 60 via the PCI bus. A facsimile control unit (FCU) 30, a universal serial bus (USB) 40, and the Institute of Electrical and Electronics Engineers 1394 (IEEE 1394) interface 50 are connected to the ASIC 16 via the PCI bus. The operation display unit 20 is directly connected to the ASIC 16.

The MEM-C 17 is a local memory used as a copy image buffer and a code buffer. The HDD 120 is a storage for accumulating image data, programs, font data, and forms.

The AGP bus 15 is a bus interface for a graphics accelerator card that is proposed for accelerating a graphics operation. The AGP bus 15 directly accesses the MEM-P 12 with high throughput, thereby accelerating the processing in the graphic accelerator card.

Incidentally, an output-condition setting program executed by the image processing apparatus according to the present embodiment is built into a ROM or the like in advance.

To provide the output-condition setting program executed by the image processing apparatus according to the present embodiment, the output-condition setting program can be stored in a computer-readable recording medium, such as a compact disk read only memory (CD-ROM), a flexible disk (FD), a CD recordable (CD-R), or a digital versatile disk (DVD), in an installable or executable file format.

Alternatively, the output-condition setting program executed by the image processing apparatus according to the present embodiment can be stored on a computer connected to a network such as the Internet so as to be downloaded via the network. Furthermore, the output-condition setting program executed by the image processing apparatus according to the present embodiment can be provided or distributed via a network such as the Internet.

The output-condition setting program executed by the image processing apparatus according to the present embodiment is composed of modules including the units described above (the input control unit 101, the condition setting unit 102, the image output unit 103, the determining unit 104, the display control unit 108, the correction-possibility determining unit 109, and the correcting unit 110). The CPU (processor) as actual hardware reads out the output-condition setting program from the ROM, and executes the output-condition setting program, whereby the above units are loaded on a main memory unit, i.e., the input control unit 101, the condition setting unit 102, the image output unit 103, the determining unit 104, the display control unit 108, the correction-possibility determining unit 109, and the correcting unit 110 are created on the main memory unit.

Incidentally, in the above embodiment, the image processing apparatus according to the present invention is applied to, as an example, the MFP having at least two functions out of a copy function, a printer function, a scanner function, and a facsimile function. However, the image processing apparatus according to the present invention is not limited to the MFP, and can be applied to any image forming apparatuses such as a copier, a printer, a scanner device, and a facsimile machine.

According to an aspect of the present invention, a plurality of document data can be output on a reoutput condition associated with specific document data.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
a storage unit that stores therein a plurality of document data and a reoutput condition associated with any of the document data, the reoutput condition defining an output condition used when the document data is reoutput;
a selection receiving unit that receives selections of the document data including at least one reoutput-conditioned document data that is associated with the reoutput condition as document data to be output;
a condition setting unit that sets the reoutput condition associated with selected reoutput-conditioned document data as the output condition; and
an image output unit that outputs all the document data of which the selections are received by the selection receiving unit on the output condition set by the condition setting unit,
wherein:
the storage unit further stores therein a restrictive condition rule for associating an attribute of document data with an item of an output condition restricted in output of the document data due to the attribute,
the image processing apparatus further comprises a determining unit that determines whether there is document data restricted in output thereof by the set output condition in the selected document data with reference to the restrictive condition rule, and
if the determining unit determines that there is document data restricted in output thereof, the image output unit outputs document data other than the document data restricted in output thereof and which corresponds to the document data restricted in the data output.

2. The image processing apparatus according to claim 1, further comprising an error-information output unit that outputs error information indicating that there is document data restricted in output thereof by the set output condition in the selected document data if the determining unit determines that there is document data restricted in output thereof.

3. The image processing apparatus according to claim 2, wherein if the determining unit determines that there is document data restricted in output thereof, the error-information output unit displays the error information indicating that there is document data restricted in output thereof by the set output condition in the selected document data on a display unit.

4. The image processing apparatus according to claim 1, wherein
the determining unit includes
an item extracting unit that extracts items from the reoutput condition associated with the selected reoutput-conditioned document data,
an attribute extracting unit that extracts attributes from the document data other than the reoutput-conditioned document data associated with the reoutput condition set as the output condition out of the selected document data, and
a judging unit that acquires a restrictive item corresponding to any of the attributes extracted by the attribute extracting unit from the restrictive condition rule, compares the acquired item with the items extracted by the item extracting unit to check whether there is any item identical to the acquired item in the extracted items, and judges, if there is an item identical to the acquired item in the extracted items, that there is document data having an attribute restricted in output of the document data by the output condition in the selected document data, and judges, if there is no item identical to the acquired item in the extracted items, that there is no document data having an attribute restricted in output of the document data by the output condition in the selected document data.

5. The image processing apparatus according to claim 4, further comprising:
a correction-possibility determining unit that determines whether there is any item applicable to the extracted attribute corresponding to the identical item in the restrictive condition rule if the judging unit judges that there is document data restricted in output thereof by the output condition in the selected document data, determines that a correction of changing the identical item to another item is possible if there is an item applicable to the extracted attribute corresponding to the identical item in the restrictive condition rule, and determines that the correction is impossible if there is no item applicable to the extracted attribute corresponding to the identical item in the restrictive condition rule; and
a first display control unit that displays an item "manual correction" and an item "automatic correction" on the display unit in selectable form to ask a user to select either a manual correction by which the correction is manually performed or an automatic correction by which the correction is automatically performed if the correction-possibility determining unit determines that the correction is possible.

6. The image processing apparatus according to claim 5, further comprising a correcting unit that resets the output condition by changing the identical item to the item applicable to the extracted attribute if the automatic correction is selected.

7. The image processing apparatus according to claim 5, further comprising an input control unit that receives an input for changing the identical item to an optional item if the manual correction is selected, wherein
the correcting unit resets the output condition by changing the matched item to the item applicable to the optional item of which the input is received by the input control unit.

8. The image processing apparatus according to claim 1, wherein if a plurality of document data associated with respective reoutput conditions are selected, the condition setting unit sets the reoutput condition associated with the initially-selected reoutput-conditioned document data as the output condition.

9. The image processing apparatus according to claim 1, further comprising:
a second display control unit that displays, if a plurality of reoutput-conditioned document data are selected, a plurality of reoutput conditions associated with the respective selected reoutput-conditioned document data on the display unit; and
an input receiving unit that receives an input of a reoutput condition, wherein
the input receiving unit receives an input for setting any of the plurality of reoutput conditions displayed on the display unit as the output condition.

10. The image processing apparatus according to claim 9, further comprising an updating unit that compares the output condition received by the input receiving unit with the reoutput condition associated with the selected document data, and updates the reoutput condition to content of the output condition if the output condition is not identical to the reoutput condition.

11. The image processing apparatus according to claim 10, wherein the updating unit updates all the selected document data to be associated with the output condition of which the input is received as the reoutput condition.

12. The image processing apparatus according to claim 10, wherein
if the output condition is updated, the second display control unit displays an item "update" and an item "not update" on the display unit in selectable form to ask a user to select whether or not to perform an update by the updating unit, and
if the item "update" is selected, the updating unit updates the output condition.

13. The image processing apparatus according to claim 12, wherein if the item "update" is selected, the second display control unit displays an item "all the selected document data" and an item "only the document data associated with the reoutput condition" as an object to be updated by the updating unit on the display unit in selectable form, and
if the item "all the selected document data" is selected, the updating unit updates all the document data of which the selections are received to be associated with the updated output condition as the reoutput condition.

14. The image processing apparatus according to claim 13, wherein if the item "only the document data associated with the reoutput condition" is selected, the updating unit updates only the document data associated with the reoutput condition to be associated with the updated output condition as the reoutput condition.

15. The image forming apparatus according to claim 1, wherein:
the attribute of document data includes sheet size and a type indicative of either black and white or color.

16. An image processing method executed in an image processing apparatus that includes a storage unit that stores therein a plurality of document data and a reoutput condition associated with any of the document data, the reoutput condition defining an output condition used when the document data is reoutput, the image processing method comprising:
receiving selections of the document data including at least one reoutput-conditioned document data that is associated with the reoutput condition as document data to be output;
setting the reoutput condition associated with selected reoutput-conditioned document data as the output condition; and
outputting all the document data of which the selections are received at the receiving on the output condition,
wherein:
the storage unit further stores therein a restrictive condition rule for associating an attribute of document data with an item of an output condition restricted in output of the document data due to the attribute,
the method further comprising determining whether there is document data restricted in output thereof by the set output condition in the selected document data with reference to the restrictive condition rule, and
if the determining determines that there is document data restricted in output thereof, the outputting outputs document data other than the document data restricted in output thereof and which corresponds to the document data restricted in the data output.

17. The image forming method according to claim 16, wherein:
the attribute of document data includes sheet size and a type indicative of either black and white or color.

18. A non-transitory computer program product comprising a computer-usable medium having computer-readable program codes embodied in the medium for implementing an image processing method executed in an image processing apparatus that includes a storage unit that stores therein a plurality of document data and a reoutput condition associated with any of the document data, the reoutput condition defining an output condition used when the document data is reoutput, the program codes when executed causing a computer to execute:
receiving selections of the document data including at least one reoutput-conditioned document data that is associated with the reoutput condition as document data to be output;
setting the reoutput condition associated with selected reoutput-conditioned document data as the output condition; and
outputting all the document data of which the selections are received at the receiving on the output condition,
wherein:
the storage unit further stores therein a restrictive condition rule for associating an attribute of document data with an item of an output condition restricted in output of the document data due to the attribute,
the method further comprising determining whether there is document data restricted in output thereof by the set output condition in the selected document data with reference to the restrictive condition rule, and
if the determining determines that there is document data restricted in output thereof, the outputting outputs document data other than the document data restricted in output thereof and which corresponds to the document data restricted in the data output.

19. The image forming apparatus according to claim 18, wherein:
the attribute of document data includes sheet size and a type indicative of either black and white or color.

* * * * *